United States Patent [19]
Adducci et al.

[11] 3,822,707
[45] July 9, 1974

[54] METAL-ENCLOSED CARDIAC PACER WITH SOLID-STATE POWER SOURCE

[75] Inventors: Anthony J. Adducci, Bear Lake; Arthur W. Schwalm, Marshall, both of Minn.

[73] Assignee: Cardiac Pacemakers, Inc., St. Paul, Minn.

[22] Filed: Apr. 17, 1972

[21] Appl. No.: 244,755

[52] U.S. Cl............................. 128/419 P, 128/421
[51] Int. Cl............................................. A61n 1/36
[58] Field of Search......... 128/419 P, 419 B, 419 E, 128/419 C, 419 R, 421, 422

[56] References Cited
UNITED STATES PATENTS
3,683,933  8/1972  Mansfield....................... 128/419 P FOREIGN PATENTS OR APPLICATIONS
1,379,694  10/1964  France............................ 128/419 P OTHER PUBLICATIONS
Greatbatch et al., "IEEE Transactions on Biomedical Engineering", Vol. BM6-18, No. 5, Sept. 1971, pp. 317-323.

Primary Examiner—William E. Kamm

[57] ABSTRACT

An improved heart pacer including the conventional combination of a pulse generator, electrode means, and electrode leads coupling the pulse generator to the electrodes, wherein the battery power source of the pulse generator is a solid-state battery with a lithium anode and a lithium-iodide electrolyte. The pacer structure is enclosed in a hermetically sealed metallic enclosure, with means being provided in the enclosure for passing electrode leads in sealed relationship therethrough. The outer surface of the casing is polished metal, and is continuous in all areas. In certain instances, the continuity may be with the exception of the zone through which the external electrode leads pass.

3 Claims, 3 Drawing Figures

PATENTED JUL 9 1974 3,822,707

METAL-ENCLOSED CARDIAC PACER WITH SOLID-STATE POWER SOURCE

BACKGROUND OF THE INVENTION

The present invention relates generally to an improved heart pacer, and more specifically to a cardiac pacer device which utilizes a solid-state lithium battery as its power source, this battery providing and facilitating a variety of significant advantages for the pacer structure. Among the most significant advantages is the provision of a completely hermetically sealed casing which provides an enclosure for the power source, pulse generator, and at least a portion of leads. The utilization of this power source, which has a non-corrosive electrolyte, provides for a compact product. In addition, the output of the power source drops or decays linearly with use, thus the power source has a readily detectable end-of-life.

In the past, a variety of cardiac pacers have been utilized, with these pacers normally employing mercury batteries for the power source. Certain characteristics, inherent in the mercury cell, prevent effective hermetic sealing of the structure, and thus cardiac pacers utilizing mercury cells are normally encapsulated or potted in synthetic resins. Because of temperature limitations which are also inherent in the mercury cells, exposure to heated sterilizing environments such as steam or the like (autoclaving) is not recommended.

For accommodating the output requirements of the conventional pacer using mercury cells, a relatively large structure is required. The size of a suitable solid-state lithium power source is almost one-half of the mercury source, with the weight being approximately one-half of the mercury power source. Since the decay curve for the mercury cells is non-linear, the end-of-life of the mercury cell is relatively difficult to predict, and hence frequent replacement may be necessary in order to provide a margin of safety for the patient requiring the device.

SUMMARY OF THE INVENTION

Briefly, in accordance with the present invention, an improved heart pacer is provided which includes the conventional combination of a pulse generator, electrode means, and electrode leads coupling the pulse generator to the electrode means. The pulse generator of the present invention includes a battery power source consisting of a battery with a lithium anode and a lithium-iodide electrolyte, this being a solid-state battery which can be hermetically sealed. The pulse forming elements of the pulse generator are preferably in the form of a hybrid circuit mounted on a suitable substrate surface, thus contributing to miniaturization of the structure. The entire pacer, with the exception of the electrode means, is hermetically sealed within a metallic enclosure, with the metallic enclosure utilizing a pair of bores formed therein for sealingly receiving the proximate end of the electrode leads in sealed relationship therewithin.

Accordingly, it is a primary object of the present invention to provide an improved heart pacer device which utilizes a battery power source consisting of a battery having a lithium anode and a lithium-iodide electrolyte, wherein the entire pacer structure is hermetically sealed within a casing having a polished exterior surface.

It is a further object of the present invention to provide an improved heart pacer device which is capable of withstanding exposure to heated sterilizing environments such as steam or the like, with the exterior of the outer casing having a polished surface.

It is yet a further object of the present invention to provide an improved heart pacer device which utilizes a solid-state battery power source having a lithium anode and a lithium-iodide electrolyte, wherein the power source, which has a detectable end-of-life, is hermetically sealed within a casing housing the power source as well as the circuit means which, together with the power source form the pulse generating portion of the device.

Other and further objects of the present invention will become apparent to those skilled in the art upon a study of the following specification, appended claims, and accompanying drawing.

DESCRIPTION OF THE PREFERRED EMBODIMENT

Figure 3:
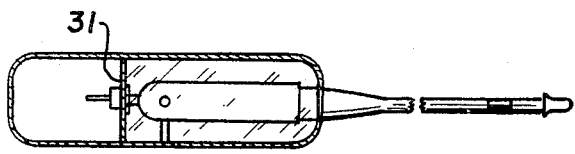
FIG. 3 is a top plan view of the device illustrated in FIG. 1.
Figure 1:
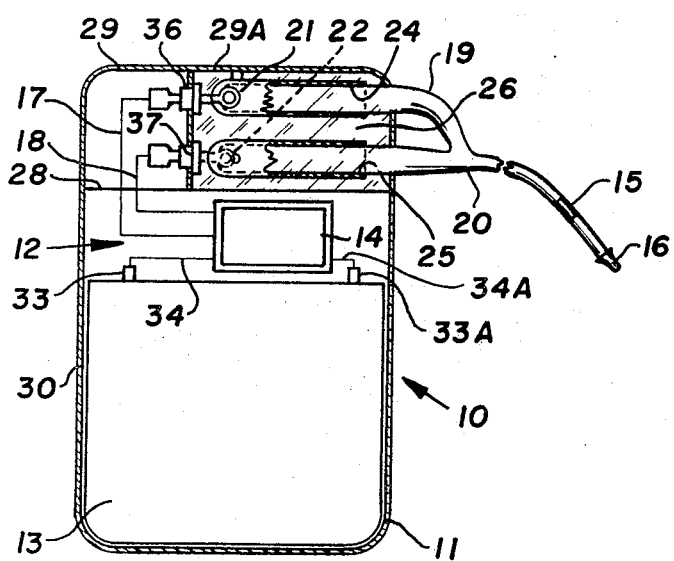
FIG. 1 is a front elevational view of the improved pacer device of the present invention, with a portion of the outer casing being shown broken away in order to expose the internal components to view.

In accordance with the preferred modification of the present invention, and with particular reference being made to FIG. 1 of the drawing, the improved pacer structure generally designated 10 includes an outer casing member 11 housing a pulse generator system generally designated 12 including a battery 13 and a circuit means 14. Electrode means are shown at 15 and 16, with electrode leads coupling the pulse generator to the electrode means. The electrode leads include first segments 17 and 18, and second segments 19 and 20 terminating in electrodes 15 and 16. Electrode leads 19 and 20 mate with contact couplings 21 and 22 which are disposed at the base of a pair of lead retaining sleeves 24 and 25, these being retained in place by a potting compound such as a high temperature thermosetting substance such as epoxy or the like, such as is shown at 26.

Casing 11 is preferably fabricated from stainless steel, particularly Stainless No. 304, which is formed in segments and welded together to form the ultimate enclosure. A weld is formed at 28 to secure an upper casing segment 29 to the lower segment 30, and a second weld may be formed at 31 to secure the two segments of the upper portion 29 and 29A together as a unit.

It is preferred that the casing of battery 13 be welded or otherwise secured to the inner surface of casing 11, so as to provide for mechanical and electrical unity. Battery 13 has posts 33 and 33A coupled to the anode and cathode and provides the poles for the cell or battery 13. Leads 34 and 34A couple the battery to the hybrid circuit element 14 which provides for the circuit portion of the pulse generator 12. Heliarc welding is a desirable technique for hermetically sealing the various portions of the casing 11 together to form a unitary structure.

The details of the circuit portion 14 of the pulse generator is preferably of the demand type, however other types may be utilized as well, if desired. One pulse generator which has been found useful is disclosed and claimed in U.S. Pat. No. 3,508,167, W. A. Greatbatch, although it will be appreciated that other circuits may be employed as well. The output from the pulse generator is electrically coupled through conductor segments 17 and 18 to contacts 21 and 22, while passing through hermetic seals 36 and 37 which are preferably of the glass-to-metal type providing an electrical lead-through from the hermetically sealed container structure. Seals 36 and 37 accordingly provide a pair of bores which sealingly receive electrodes 17 and 18.

Figure 2:
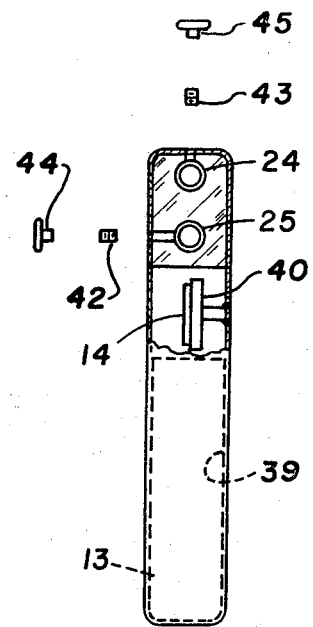
FIG. 2 is a side elevational view of the device shown in FIG. 1, with the electrodes and electrode leads being removed for illustrating the contact zone of the device.

Battery power source 13 is provided with a metallic enclosure, such as is shown at 39 (FIG. 2), with this enclosure providing a substantially hermetic seal for the battery source. Since gases are not generated during the discharge of the lithium solid-state battery, encapsulation is a feature which is possible. Lithium solid-state batteries which are designed for optimum performance at 98°F. are commercially available, specifically from Wilson Greatbatch Ltd. of Clarence, N.Y. Also, the casing 39 of the battery power source may provide the indifferent electrode if desired. As is indicated in FIG. 2, mounting plate 40 is, in turn, welded to the interior of casing 11. It will be noted that this technique for mounting, while electrically coupling the hybrid circuit 14 to the casing 11, thermally isolates the element to an extent for permitting exposure of the device to heated sterilizing environment such as steam.

With attention now being directed to FIG. 2 of the drawing, it will be observed that the sleeves 24 and 25, which are preferably nylon extruded sleeves, have a pair of Allen-head set screws 42 and 43 which are used to lock the inner or proximate ends of lead portions 19 and 20 in place. Insulating plugs such as the rubber plugs 44 and 45 are utilized to electrically isolate the set screws 42 and 43 from the body cavity environment. It will be further noted that the set screws 42 and 43 are disposed on separate and adjacent outer surfaces of the casing 11, thus extending the peripheral distance therebetween, and reducing the chances of significant electrical leakage.

As has been indicated, the lithium solid-state battery has a linear output at normal power drains which drop predictably with the lifetime of the battery. In other words, the decay curve is a substantially straight line function. At the beginning of life of the battery, the internal impedance is generally about 1,000 ohms, while at the end-of-life of the battery, the internal impedance is approximately 16,000 ohms. It has been recommended that when the pulse energy output of the pacer drops to a value of 30 percent above the energy threshold of the electrode, replacement of the pulse generator should occur. End-of-life has accordingly been arbitrarily selected at 2.2 volts for a battery having an initial output of 2.8 volts.

We claim:

1. In a heart pacer comprising, in combination, a pulse generator, electrode means, and electrode leads coupling said pulse generator to said electrode means, with said pulse generator including a battery power source and pulse forming means;
    a. said battery power source having a lithium anode and a lithium-iodide electrolyte;
    b. said pulse forming means comprising circuit means having an input and an output, with said input being coupled to said battery power source and said output being coupled to said leads;
    c. a first metallic enclosure means encapsulating said battery power source and casing means consisting of a second metallic enclosure means hermetically encapsulating said first metallic enclosure means, said pulse forming means, and at least a portion of said electrode leads, said casing having bore means formed therein for sealingly receiving said electrode leads in sealed relationship therewithin; and
    d. means being provided for electrically coupling and thermally isolating said pulse forming means from said casing means.

2. The heart pacer means as defined in claim 1 being particularly characterized in that hybrid circuit means are provided and are mounted within said casing means, and said pulse forming means are mounted on said hybrid circuit.

3. In a heart pacer comprising, in combination, a pulse generator, electrode means, and electrode leads coupling said pulse generator to said electrode means, with said pulse generator including a battery power source and pulse forming means;
    a. said battery power source having a lithium anode and a lithium-iodide electrolyte;
    b. said pulse forming means comprising circuit means having an input and an output, with said input being coupled to said battery power source and said output being coupled to said leads;
    c. a first metallic enclosure means encapsulating said battery power source and casing means consisting of a second metallic enclosure means hermetically encapsulating said first metallic enclosure means, said pulse forming means, and at least a portion of said electrode leads, said casing having a pair of bores formed therein for sealingly receiving said electrode leads in sealed relationship therewithin; and
    d. locking means being provided to lockingly engage said electrode leads within said casing means, said locking means being disposed in bores formed in said casing and being disposed on separate and adjacent outer surfaces thereof for providing an extended peripheral distance therebetween.

* * * * *

UNITED STATES PATENT AND TRADEMARK OFFICE
CERTIFICATE OF CORRECTION

PATENT NO.       : 3,822,707 B2
APPLICATION NO.  : 05/244755
DATED            : July 9, 1974
INVENTOR(S)      : Adducci et al.

It is certified that error appears in the above-identified patent and that said Letters Patent is hereby corrected as shown below:

On the face page, in field (75), under "Inventors", in column 1, line 2, after "Marshall," delete "both of Minn." and insert - - Manuel A. Villafana, Wayzata; James L. Baustert, Saint Paul, all of Minn. - - therefor.

Signed and Sealed this

Eighth Day of August, 2006

JON W. DUDAS
*Director of the United States Patent and Trademark Office*